United States Patent
Hampel et al.

(10) Patent No.: US 10,003,438 B2
(45) Date of Patent: Jun. 19, 2018

(54) RELAY OPERATION FOR LATENCY SENSITIVE RELIABLE DATA EXCHANGE

(71) Applicant: QUALCOMM Incorporated, San Diego, CA (US)

(72) Inventors: Karl Georg Hampel, New York, NY (US); Vincent Douglas Park, Budd Lake, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 15/154,385

(22) Filed: May 13, 2016

(65) Prior Publication Data
US 2017/0214493 A1    Jul. 27, 2017

Related U.S. Application Data

(60) Provisional application No. 62/287,155, filed on Jan. 26, 2016.

(51) Int. Cl.
| | |
|---|---|
| *H04W 84/12* | (2009.01) |
| *H04L 1/08* | (2006.01) |
| *H04L 5/00* | (2006.01) |
| *H04L 29/06* | (2006.01) |
| *H04W 72/12* | (2009.01) |

(Continued)

(52) U.S. Cl.
CPC .............. *H04L 1/08* (2013.01); *H04L 1/1887* (2013.01); *H04L 1/1893* (2013.01); *H04L 5/0055* (2013.01); *H04L 69/28* (2013.01); *H04W 40/244* (2013.01); *H04W 72/1278* (2013.01); *H04L 2001/0093* (2013.01);

(Continued)

(58) Field of Classification Search
CPC ........... H04W 72/1278; H04W 40/244; H04W 88/12; H04W 72/12; H04L 1/08; H04L 5/0055; H04L 69/28
See application file for complete search history.

(56) References Cited

U.S. PATENT DOCUMENTS

| | | |
|---|---|---|
| 2008/0222478 A1 | 9/2008 | Tamaki |
| 2010/0322143 A1* | 12/2010 | Cai ........................... H04L 1/16 370/315 |

(Continued)

OTHER PUBLICATIONS

International Search Report and Written Opinion—PCT/US2017/014335—ISA/EPO—dated Apr. 21, 2017.

*Primary Examiner* — Andrew Lee
(74) *Attorney, Agent, or Firm* — Haynes and Boone, LLP

(57) ABSTRACT

Systems and methods are disclosed for using wireless relays to create path diversity in rebroadcasting data in wireless networks with latency sensitive applications. A first wireless communication device receives a data signal, the data signal being transmitted on a first frequency resource from a second wireless communication device to a third wireless communication device. The first wireless communication device receives an ACK/NACK signal being transmitted from the third wireless communication device to the second wireless communication device. The first wireless communication device determines if the ACK/NACK signal is a NACK signal, and if so transmits the data signal at a second frequency resource during a third time period to the third wireless communication device.

26 Claims, 10 Drawing Sheets

(51) Int. Cl.
  *H04W 40/24*    (2009.01)
  *H04L 1/18*     (2006.01)
  *H04W 88/12*    (2009.01)
  *H04W 88/04*    (2009.01)
  *H04L 1/00*     (2006.01)
(52) U.S. Cl.
  CPC ..... *H04L 2001/0097* (2013.01); *H04W 88/04* (2013.01); *H04W 88/12* (2013.01)

(56) References Cited

U.S. PATENT DOCUMENTS

| | | | |
|---|---|---|---|
| 2013/0128803 A1* | 5/2013 | Takahashi | H04L 1/1812 370/315 |
| 2013/0294299 A1* | 11/2013 | Park | H04L 1/0073 370/280 |
| 2014/0140296 A1* | 5/2014 | Choi | H04J 11/0036 370/329 |
| 2014/0321422 A1* | 10/2014 | Choi | H04L 1/1861 370/330 |
| 2015/0003304 A1* | 1/2015 | Wu | H04L 1/1854 370/280 |
| 2015/0049732 A1* | 2/2015 | Xue | H04L 1/1854 370/330 |
| 2015/0257041 A1* | 9/2015 | Su | H04W 36/0016 455/437 |
| 2015/0327275 A1 | 11/2015 | Kwon et al. | |
| 2016/0150518 A1* | 5/2016 | He | H04W 72/0406 370/329 |
| 2016/0174282 A1* | 6/2016 | Grant | H04W 76/028 455/422.1 |
| 2016/0262172 A1* | 9/2016 | Yan | H04W 72/1268 |
| 2017/0244521 A1* | 8/2017 | Lim | H04L 1/1819 |

\* cited by examiner

RELAY OPERATION FOR LATENCY SENSITIVE RELIABLE DATA EXCHANGE

CROSS-REFERENCE TO RELATED APPLICATIONS

This application claims priority from U.S. Provisional Patent Application Ser. No. 62/287,155, filed on Jan. 26, 2016, entitled "Relay Operation For Latency Sensitive Reliable Data Exchange," the entire disclosure of which is incorporated herein by reference.

TECHNICAL FIELD

This application relates to wireless communications systems, and in particular to using wireless relays to create path diversity in rebroadcasting data in wireless networks with mission-critical applications.

INTRODUCTION

Wireless technology is prevalent in sensor and control device networks. In mission-critical sensor and control networks, such as factory automation networks, error tolerances are extremely low. In some cases, error tolerances may be as low as one in a billion packet losses. As a result, error prevention solutions that are suitable in many wireless networks may not be sufficient for mission-critical networks. Therefore, there is a need for systems and methods to functionally prevent errors in mission-critical wireless networks.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes receiving, at a first wireless communication device, a data signal, the data signal being transmitted on a first frequency resource from a second wireless device to a third wireless device. The method further includes receiving, at the first wireless communication device, an ACK/NACK signal being transmitted from the third wireless device to the second wireless device. The method further includes determining, at the first wireless communication device, if the ACK/NACK signal is a NACK signal. The method further includes transmitting, from the first wireless communication device to the third wireless device, the data signal at a second frequency resource during a third time period, if the ACK/NACK signal is determined to be a NACK signal.

In an additional aspect of the disclosure, a method of wireless communication includes receiving, at a first wireless communication device, a notification that a data signal will be transmitted to the first wireless communication device from a second wireless communication device on a first frequency resource during a first time period. The method further includes transmitting, from the first wireless communication device, a NACK indicating that the data signal was not properly received from the second wireless communication device. The method further includes receiving, at the first wireless communication device, the data signal from a third wireless communication device on a second frequency resource during a second time period.

In an additional aspect of the disclosure, a first wireless communication device includes a transceiver configured to receive a data signal being transmitted from a second wireless communication device to a third wireless communication device on a first frequency resource, the transceiver further configured to receive an ACK/NACK signal being transmitted from the third wireless communication device to the second wireless communication device, and a processor configured to determine if the ACK/NACK signal is a NACK signal. The transceiver is further configured to transmit to the third wireless communication device the data signal on a second frequency resource during a third time period, if the ACK/NACK signal is determined to be a NACK signal.

In an additional aspect of the disclosure, a first wireless communication device includes a transceiver configured to receive a notification that a data signal will be transmitted to the first wireless communication device from a second wireless communication device on a first frequency resource during a first time period. The transceiver is further configured to transmit a NACK indicating that the data signal was not properly received from the second wireless communication device, and to receive the data signal from a third wireless communication device on a second frequency resource during a second time period.

In an additional aspect of the disclosure, a computer-readable medium having program code recorded thereon includes code for causing a first wireless communication device to receive a data signal, the data signal being transmitted on a first frequency resource from a second wireless communication device to a third wireless communication device, code for causing the first wireless communication device to receive an ACK/NACK signal being transmitted from the third wireless communication device to the second wireless communication device, code for causing the first wireless communication device to determine if the ACK/NACK signal is a NACK signal, and code for causing the first wireless communication device to transmit to the third wireless communication device the data signal on a second frequency resource during a third time period, if the ACK/NACK signal is determined to be a NACK signal.

In an additional aspect of the disclosure, a computer-readable medium having program code recorded thereon includes code for causing a first wireless communication device to receive a notification that a data signal will be transmitted to the first wireless communication device from a second wireless communication device on a first frequency resource during a first time period, code for causing the first wireless communication device to transmit a NACK indicating that the data signal was not properly received from the second wireless communication device, and code for causing the first wireless communication device to receive the data signal from a third wireless communication device on a second frequency resource during a second time period.

In an additional aspect of the disclosure, a first wireless communication device includes means for receiving a data signal, the data signal being transmitted on a first frequency resource from a second wireless communication device to a third wireless communication device, means for receiving an ACK/NACK signal being transmitted from the third wireless communication device to the second wireless communication device, means for determining if the ACK/

NACK signal is a NACK signal, and means for transmitting to the third wireless communication device the data signal on a second frequency resource during a third time period, if the ACK/NACK signal is determined to be a NACK signal.

In an additional aspect of the disclosure, a first wireless communication device includes means for receiving a notification that a data signal will be transmitted to the first wireless communication device from a second wireless communication device on a first frequency resource during a first time period, means for transmitting a NACK indicating that the data signal was not properly received from the second wireless communication device, and means for receiving the data signal from a third wireless communication device on a second frequency resource during a second time period.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1A:
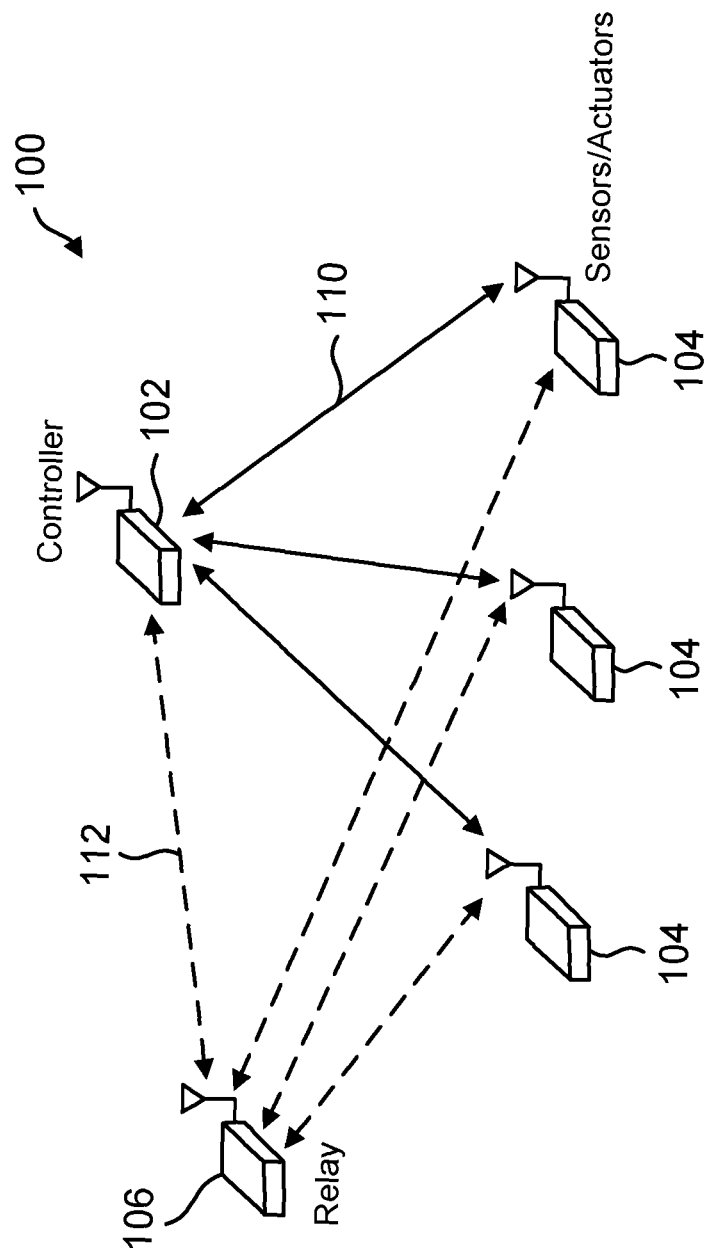
FIG. 1A illustrates a wireless communication network in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G)) network.

Embodiments of the present disclosure describe a system for ensuring reliability of wireless links in latency sensitive wireless applications, such as factory automation sensor and actuator networks used for control-loop applications. These networks rely on reliable data exchange for latency sensitive control-loop applications. Such networks are therefore vulnerable to obstructions of the main communication path between controller and sensor devices which is detrimental to factory operation. In such systems, packet error rates (PER) of up to $1 \times 10^{-9}$ may be used, as a single packet drop could cause catastrophic results, such as a robot malfunctioning and injuring a bystander. At least one wireless relay is added to the network to create path and frequency diversity for retransmissions of dropped packets. The relay has global knowledge of the schedule of transmissions for a controller and a plurality of sensor or actuator devices (SAs). The global schedule data may include the time and frequency resources that are scheduled to be used for future transmissions and that were used for past transmissions.

In one example, a relay is introduced which provides an alternative data path. The relay acts as a repeater for retransmissions. It overhears the initial transmission of data packets as well as the ACK/NAK response. Based on this is selects the links that are scheduled for retransmissions. It then determines the air-interface resources used for these retransmissions which is based on a deterministic mapping. It then jointly transmits the data together with the retransmission by the original source (which can be the controller or the sensors). Since the reason for transmission failure is with some likelihood attributed to interference in the unlicensed band, the relay transmits in a different band than where the original transmission has occurred. The relay monitors all transmissions made between the controller and the plurality of SAs. The transmissions consist of at least data signals, data re-transmission signals, and ACK/NACK signals. These transmissions may be structured according to, for example, an Automatic Repeat reQuest (ARQ) or Hybrid Automatic Repeat reQuest (HARQ) error control system. The relay is able to decode and cache the data and ACK/NACK signals. When the relay decodes a NACK signal it can determine that a transmission has failed, and it is able to determine, using its knowledge of the system's schedule, which one of the controller or the plurality of SAs lost a packet. The relay is also able to determine, based on its knowledge of the schedule, which cached signal failed, and can re-encode the cached signal and re-transmit it to the appropriate network device during the time period and on the frequency scheduled for re-transmissions.

FIG. 1A illustrates a wireless communication network 100 in accordance with various aspects of the present disclosure. The wireless network 100 may include a controller device 102, a number of sensor or actuator devices (SAs) 104, and at least one relay device 106. The controller 102 may in some embodiments include a base station. A base station may include an evolved Node B (eNodeB) in the LTE context, for example. A base station may also be referred to as a base transceiver station or an access point. For simplicity of discussion, it will be referred to herein as a base station. The base station may be one of various types of base station such as a macro, pico, and/or femto base station.

The SAs 104 may include various types of wireless devices that integrate sensors or meters to capture information such as smart meters, temperature sensors, strain sensors, pressure sensors, fluid flow monitors, water level monitors, equipment monitors, weather and geological event monitors, location trackers, accelerometers, infrared sensors, and the like. The SAs 104 may further include various types of wireless devices that integrate actuators to cause attached devices such as robots or other machinery to perform actions such as turning on or off, or moving one or more components. In some embodiments, the SAs 104 may be "internet of everything" (JOE) or "internet of things" (IOT) devices. The relay 106 may include various types of wireless communication devices that integrate wireless monitoring, data storage, and data transmission capabilities, including devices similar to those described above with respect to the controller 102 and the SAs 104. In some instances, the relay 106 may be a controller 102 or an SA 104 configured to perform the functions of the relay 106 as described herein. The SAs 104 and/or the relay 106 may be low power devices designed to run on compact batteries for extended periods of time. The SAs 102 may be attached to various devices, such as robots, in a factory automation system. The controller 102 and SAs 104 may be dispersed throughout the wireless network 100, and each controller 102, SA 104 or relay 106 may be stationary or mobile. It is understood that more than one relay 106 may be used in a network 100 to provide further path diversity.

There are first wireless links 110 between controller device 102 and SAs 104. The controller device 102 and SAs 104 actively transmit data back and forth over first wireless links 110. There are second wireless links 112 between the relay 106 and the controller 102 and SAs 104. The relay 106 in this embodiment monitors transmissions made between the controller 102 and between the relay 106 and the SAs 104, but only transmits when re-transmissions are requested.

Figure 1B:
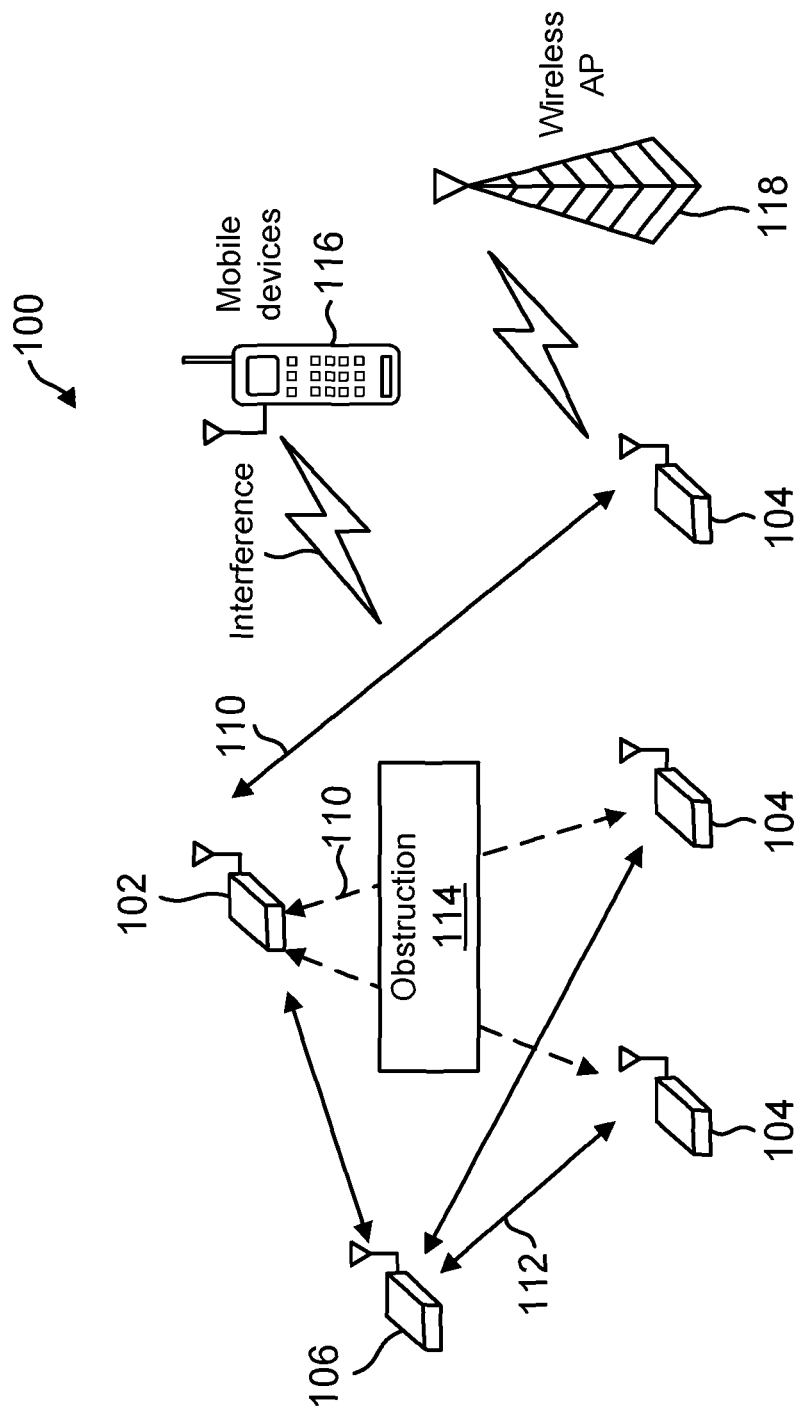
FIG. 1B illustrates the wireless communication network of FIG. 1A with obstructions and sources of interference.

Referring now to FIG. 1B, there is illustrated the network 100 of FIG. 1A with the addition of obstruction 114, interfering mobile device 116, and interfering wireless access point (AP) 118. These new objects may cause transmission failures over links 110. For example, obstruction 114 may be an object situated between one or more SAs 104 and controller 102, which causes shadow fading in links 110. The obstruction 114 may be a moving object, for example a person, a fork lift, or a piece of automated equipment in a factory environment. Relay 106 may be situated so that it is unlikely that both the links 112 (between the relay 106 and controller 102 and SAs 104) and the links 110 (between the relay controller 102 and SAs 104) are affected by objects such as obstruction 114. In this way, the relay 106 may provide path diversity to the network 100.

Mobile device 116 and AP 118 may transmit using the same time and/or frequency resources as the controller 102 and SAs 104, and may thereby cause collisions in the communications between controller 102 and SAs 104. For example, an employee in a factory environment may walk through network 100 carrying a mobile device 116, or a piece of factory equipment such as a high frequency welder emitting electromagnetic energy at high power in the unlicensed band. The location of relay 106 may decrease interference from mobile device 116 and AP 118 simply due to falloff. Additionally, re-transmissions in the system may be made in a licensed frequency band, thereby greatly decreasing the likelihood of interference during re-transmission.

Embodiments of this disclosure are directed to any type of modulation scheme, but frequency division multiplexing (FDM) is used as a representative modulation for data transmissions in the downlink to SAs 104 from the controller 102 and the uplink to controller 102 from the SAs 104. FDM is a multi-carrier modulation technique that partitions the overall system bandwidth into multiple frequency subbands, carrier frequencies, or channels. With FDM, each channel may be modulated with data.

The controller 102 may periodically send synchronization signals to the SAs 104 and to the relay 106. These synchronization signals are used to enable the SAs 104 and the relay 106 to periodically synchronize their local clocks with the clock of the controller 102. This can be useful because the clocks of the SAs 104 and relay 106 may be less accurate due to low power demands imposed on them. Thus, over time the clocks for the SAs 104 and relay 106 may drift relative to the clock of the controller 102, which may be a higher power device that tends to be more accurate and stable. Due to the drift, an offset can arise between the time at which a receiver of a given SA 104 or relay 106 wakes up to listen for a signal from the controller 102 and the time at which the receiver of the given SA 104 or relay 106 actually receives the signal from the base controller 102. If the drift becomes large enough, then the given SA 104 or relay 106 will no longer be able to decode the signal received from the controller 102. The synchronization signal provides information that allows the SAs 104 or relay 106 to re-synchronize to the clock of the controller 102.

The synchronization signal may be periodically sent for example at pre-specified time intervals that the SAs 104 and relay 106 are made aware of. For example, this may be established at a time of initial setup such as when an SA 104 or relay 106 attaches to the network via the controller 102. Alternatively, or in addition, the controller 102 may establish the periodicity of the synchronization signal, as well as what frequency and time at which the synchronization signal will be transmitted, with a command sent to the SAs 104 and relay 106 to place them into sleep mode. The synchronization signal may be embedded within an FDM downlink waveform that includes other information (such as data or control information) for one or more other SAs 104. The synchronization signal may be broadcast to all SAs 104 within range of the FDM downlink waveform and be modulated according to a different modulation scheme than that used for the rest of the FDM downlink waveform. The SAs 104 and relay 106 within the network 100 may wake up at the pre-specified times that the synchronization signal is broadcast to re-sync to the clock of the controller 102, as described above.

According to further embodiments of the present disclosure, the controller 102 and each SA 104 within the network 100 may be assigned a particular set of resources (e.g., frequency carrier(s) and time slot(s)) at which they are to transmit or listen for data, ACK/NACK signals, or other signals used by an appropriate protocol. This information is referred to as global scheduling data, or global scheduling information. The global scheduling data is made known to the controller 102, the SAs 104, and the relay 106. In some embodiments, the controller 102 assigns the resources for the network 100.

The controller 102 may periodically send global scheduling data to the SAs 104 and the relay 106. The scheduling information can include a mapping of time and frequency resources allocated to the controller 102 and the SAs 104 for transmission as well as the type of transmission that is scheduled for those resources. For example, the schedule may indicate that a particular SA 104 is scheduled to transmit data to the controller 102 during a first time slot on a first frequency, the controller 102 is scheduled to transmit an ACK/NACK signal in a second time slot on a second frequency, a third time slot and third frequency are reserved for potential retransmission of data from the SA 104 to the controller 102, and a fourth time slot and fourth frequency are reserved for an ACK/NACK signal for the re-transmitted data.

The global scheduling information can allow at least the relay 106 to determine what signals it is monitoring, which devices sent the signals it is monitoring, and which devices those signals were intended for. The relay 106 can determine, based on the schedule, the time slot during which a signal is monitored and the frequency on which the signal is monitored. Furthermore, with full schedule information, a relay 106 may operate to re-transmit any dropped packets to their intended recipient during the scheduled re-transmission time period and on the scheduled re-transmission frequency. To the recipient, the received re-transmission packets will look exactly like the packets that it expects to receive from the transmitting device. Since the original transmitting device (e.g., the controller 102 or an SA 104) will also autonomously re-transmit the data, the likelihood of any re-transmission succeeding is increased by the presence of the relay 106.

Similar to the synchronization signal, the scheduling information may be periodically sent at pre-specified time intervals that the SAs 104 and relay 106 are made aware of. Scheduling data may be established at the time that the system is initiated, and new scheduling data may be periodically sent to maintain unbroken scheduling data at all devices in the network 100. According to some embodiments of the present disclosure, a base station external to the controller 102 may perform the above functions of sending the synchronization signal and the global scheduling data to all devices in network 100, including the controller 102, SAs 104, and relay 106. As described above with reference to FIG. 1A, such a base station may include an eNodeB, and the base station may be one of various types of base station such as a macro, pico, and/or femto base station.

Figure 2:
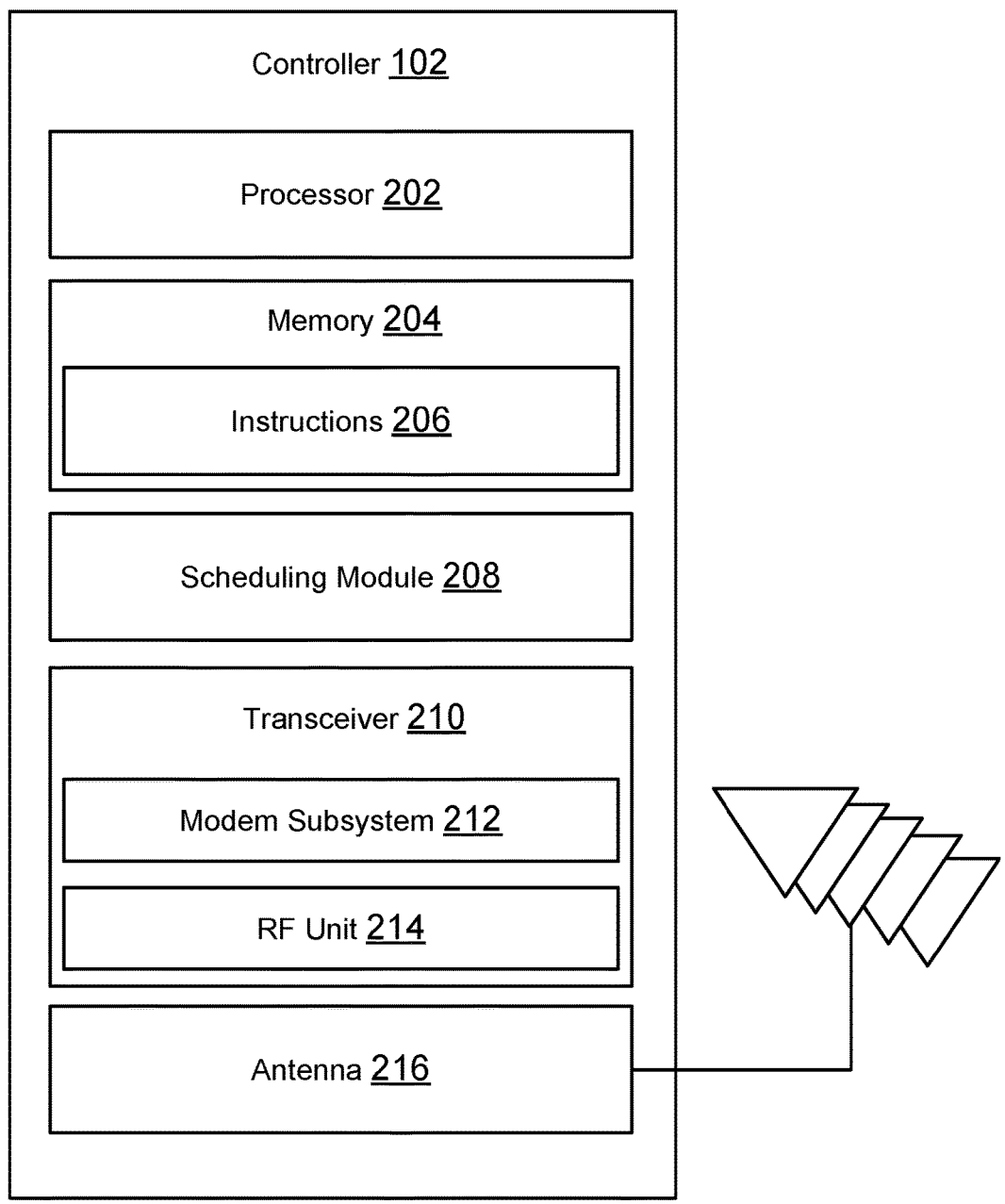
FIG. 2 is a block diagram illustrating an exemplary controller in accordance with various aspects of the present disclosure.

FIG. 2 is a block diagram illustrating an exemplary controller 102 according to embodiments of the present disclosure. The controller 102 may include a processor 202, a memory 204, a scheduling module 208, a transceiver 210, and an antenna 216. These elements may be in direct or indirect communication with each other, for example via one or more buses. As mentioned above with respect to FIG. 1, the controller 102 may communicate with multiple SAs 104 and with the relay 106.

The transceiver 210 may include a modem subsystem 212 and a radio frequency (RF) unit 214. The transceiver 210 is configured to communicate bi-directionally with other devices, such as one or more UEs 120 and LP IOEs 130. The modem subsystem 212 may be configured to modulate and/or encode data according to a modulation and coding scheme (MCS), e.g., a low-density parity check (LDPC) coding scheme, a turbo coding scheme, a convolutional coding scheme, etc.

The RF unit 214 may be configured to process (e.g., perform analog to digital conversion or digital to analog conversion, etc.) modulated/encoded data from the modem subsystem 212 (on outbound transmissions) or transmissions originating from another source such as an SA 104 or relay 106. Although shown as integrated together in transceiver 210, the modem subsystem 212 and the RF unit 214 may be separate devices that are coupled together at the controller 102 to enable the controller 102 to communicate with other devices.

The RF unit 214 may provide the modulated and/or processed data, e.g. data packets, to the antenna 216 for transmission to one or more other devices such as SAs 104. After the transceiver 210 receives the FDM information with the synchronization, data, and/or ACK/NACK embedded within it from the scheduling module 208, the modem subsystem 212 may modulate and/or encode the identifying information in preparation for transmission. The RF unit 214 may receive the modulated and/or encoded data packet and process the data packet prior to passing it on to the antenna 216. This may include, for example, transmission of data messages to one or more SAs 104 according to embodiments of the present disclosure. The antenna 216 may further receive data messages transmitted from an SA 104 or relay 106, and provide the received data messages for processing and/or demodulation at the transceiver 210. As illustrated, the antenna 216 may include multiple antennas of similar or different designs in order to sustain multiple transmission links.

Figure 3A:
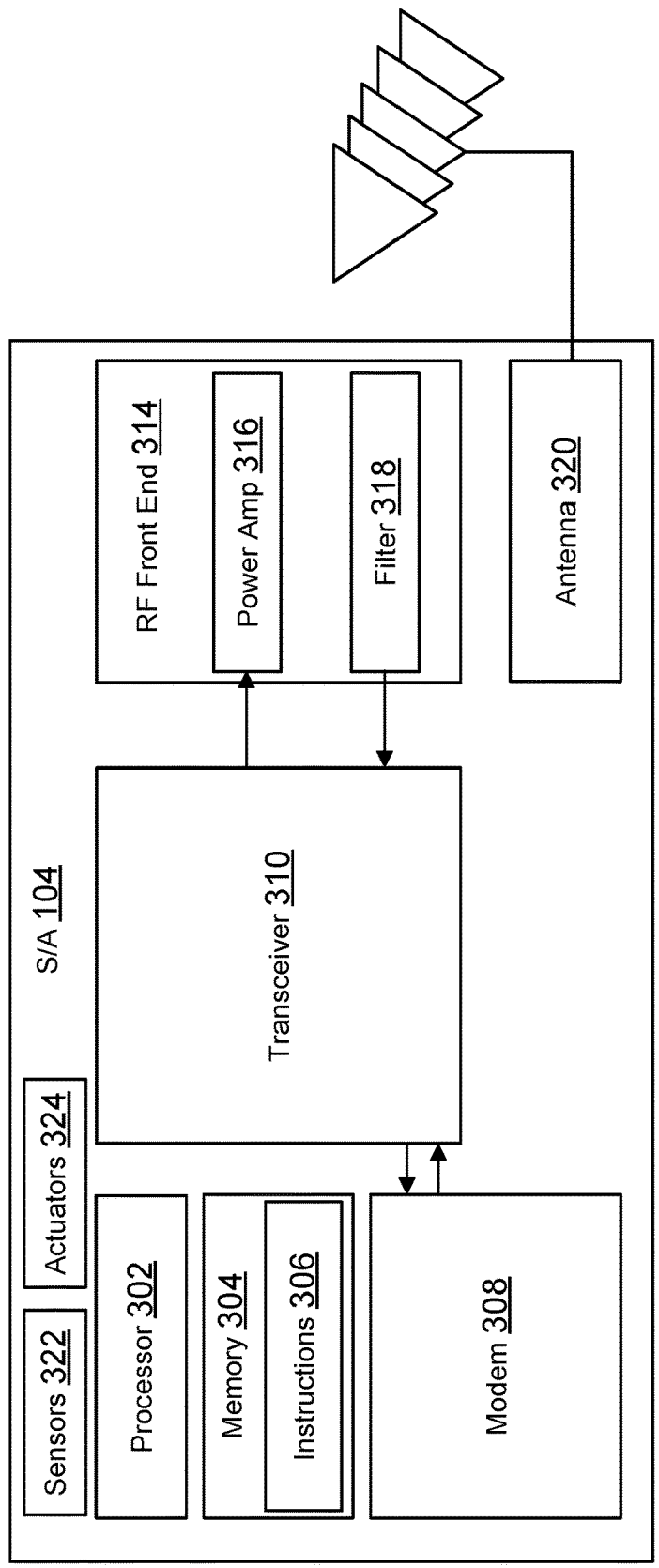
FIG. 3A is a block diagram illustrating an exemplary sensor or actuator device accordance with various aspects of the present disclosure.

FIG. 3A is a block diagram of an exemplary SA 104 according to embodiments of the present disclosure. The SA 104 may include a processor 302, a memory 304, a modem 308, a transceiver 310, an RF front end 314, one or more antennas 320, and one or more sensors 322 and/or actuators 324. These elements may be in direct or indirect communication with each other, for example via one or more buses. As mentioned above with respect to FIG. 1, the SA 104 may communicate with a controller 102 and other SAs 104 that are within range.

The processor 302 may include a CPU, a DSP, an ASIC, a controller, a FPGA device, another hardware device, a firmware device, or any combination thereof configured to perform the operations described herein with reference to the SA 104 introduced in FIGS. 1A-1B above. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid state memory device, one or more hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the SA 104 in connection with embodiments of the present disclosure. Instructions 306 may also be referred to as code, which may be interpreted broadly to include any type of computer-readable statement(s) as discussed above with respect to FIG. 2.

The modem subsystem 308 may be configured to modulate and/or encode data according to a modulation and coding scheme (MCS), e.g., a low-density parity check (LDPC) coding scheme, a turbo coding scheme, a convolutional coding scheme, etc.

The transceiver 310 may include a transmitter and a receiver and any other components to allow transmission and reception of data, for example to process (e.g., perform analog to digital conversion or digital to analog conversion, etc.) modulated/encoded data from the modem subsystem 308 (on outbound transmissions) or transmissions originating from another source such as a relay 106 or controller 102. For the transmitter, this may include digital to analog conversion, a local oscillator, and upconversion of baseband signals to the selected transmission frequency, to name just a few examples. For the receiver, this may include a down converter to put the received signal at baseband, a baseband filter, and an analog-to-digital converter to name a few examples.

The RF front end 314 may include a filter 318, which may be for example a band-pass filter to filter out-of-band signals. The RF front end 314 may also include an impedance matching circuit and an amplifier 316. Although illustrated as separate, as will be recognized some aspects described above with respect to the transceiver 310 may be performed by the RF front end 314 (e.g., upconversion, downconversion, and mixing) and vice versa. The RF front end 314 may provide the modulated and/or processed data, e.g. data packets, to the antenna 320 for transmission to the controller 102 or other SAs 104.

The antenna 320 may include one or multiple antennas of similar or different designs in order to sustain a single or multiple transmission links, respectively. The antenna 320 of the LP IOE 130 may transmit data provided from the transceiver 310 after modulation and coding from the modem subsystem 308 and amplification at the RF front end 314. The antenna 320 of the SA 104 may also receive data from multiple sources, including from a controller 102. The antenna 320 may feed the received data to the RF front end 314.

The one or more sensors 322 may include, for example, smart meters, temperature sensors, strain sensors, pressure sensors, fluid flow monitors, water level monitors, equipment monitors, weather and geological event monitors, location trackers, accelerometers, infrared sensors, and the like. The one or more actuators 324 may function, for example, to cause attached devices or components to perform specific actions such as turning on or off, moving in a particular manner (including translation, rotation, and/or combinations thereof), and/or performing other functions associated with the SA 104 or a system in which the SA is implemented. The one or more actuators 324 can include electric, pneumatic, hydraulic, and/or mechanical actuators.

Figure 3B:
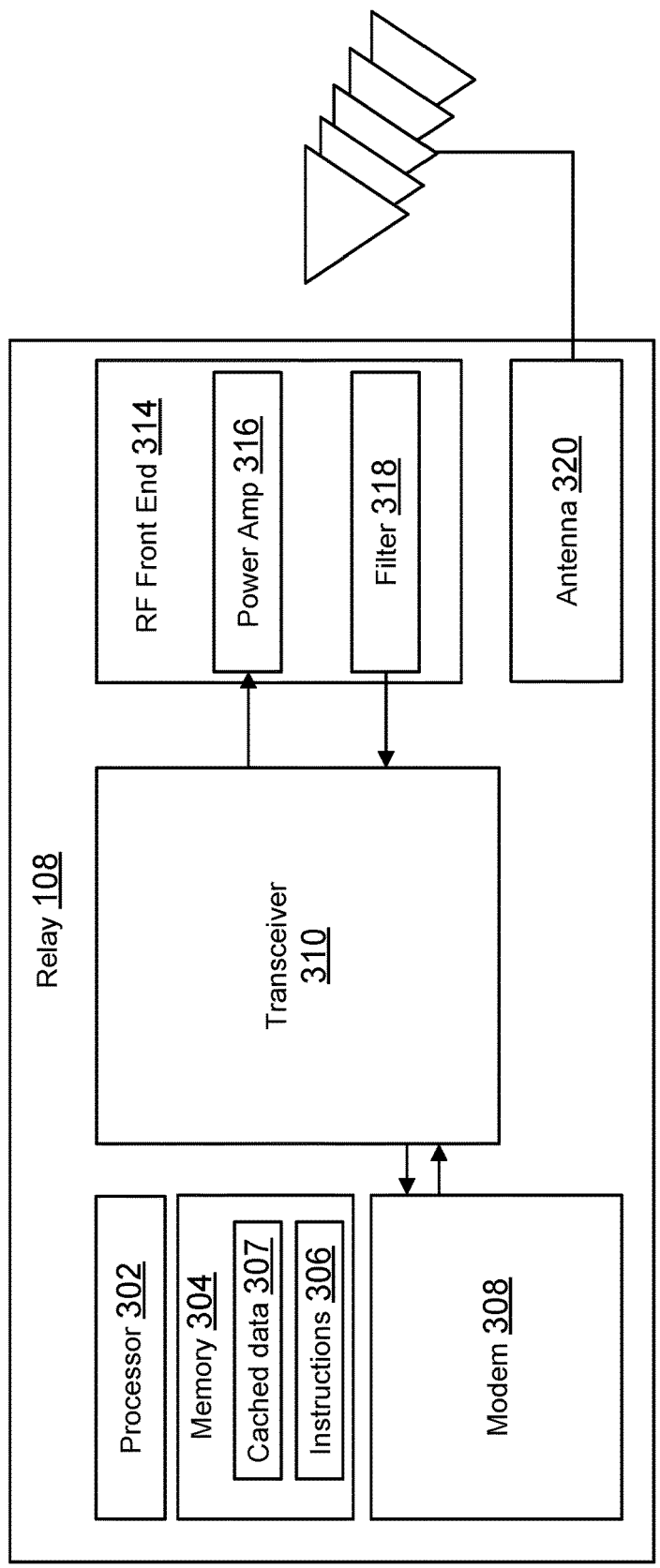
FIG. 3B is a block diagram of an exemplary wireless relay according to various aspects of the present disclosure.

FIG. 3B is a block diagram of an exemplary relay 106 according to embodiments of the present disclosure. In many aspects, the relay 106 may be similar to the SAs 104. The relay 106 or relay 106 may include a processor 302, a memory 304, a modem 308, a transceiver 310, an RF front end 314, one or more antennas 320, and one or more sensors and/or actuators 322. These elements may be in direct or indirect communication with each other, for example via one or more buses. As mentioned above with respect to FIG. 1, the relay 106 may communicate with a controller 102 and other SAs 104 that are within range.

The processor 302 may include a CPU, a DSP, an ASIC, a controller, a FPGA device, another hardware device, a firmware device, or any combination thereof configured to perform the operations described herein with reference to the relay 106 introduced in FIGS. 1A-1B above. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid state memory device, one or more hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the relay 106 in connection with embodiments of the present disclosure. Instructions 306 may also be referred to as code, which may be interpreted broadly to include any type of computer-readable statement(s) as discussed above with respect to FIG. 2. The memory 304 may further store cached data 307 in accordance with various aspects of the disclosure. For example, received data signals and/or received ACK/NACK signals may be stored as cached data 307 in memory 304.

The modem subsystem 308 may be configured to modulate and/or encode data according to a modulation and coding scheme (MCS), e.g., a low-density parity check (LDPC) coding scheme, a turbo coding scheme, a convolutional coding scheme, etc.

The transceiver 310 may include a transmitter and a receiver and any other components to allow transmission and reception of data, for example to process (e.g., perform analog to digital conversion or digital to analog conversion, etc.) modulated/encoded data from the modem subsystem 308 (on outbound transmissions) or transmissions originating from another source such as an SA 104 or controller 102. For the transmitter, this may include digital to analog conversion, a local oscillator, and upconversion of baseband signals to the selected transmission frequency, to name just a few examples. For the receiver, this may include a down converter to put the received signal at baseband, a baseband filter, and an analog-to-digital converter to name a few examples.

The RF front end 314 may include a filter 318, which may be for example a band-pass filter to filter out-of-band signals. The RF front end 314 may also include an impedance matching circuit and an amplifier 316. Although illustrated as separate, as will be recognized some aspects described above with respect to the transceiver 310 may be performed by the RF front end 314 (e.g., upconversion, downconversion, and mixing) and vice versa. The RF front end 314 may provide the modulated and/or processed data, e.g. data packets, to the antenna 320 for transmission to the controller 102 or other SAs 104.

The antenna 320 may include one or multiple antennas of similar or different designs in order to sustain a single or multiple transmission links, respectively. The antenna 320 of the LP IOE 130 may transmit data provided from the transceiver 310 after modulation and coding from the modem subsystem 308 and amplification at the RF front end 314. The antenna 320 of the relay 106 may also receive data from multiple sources, including from a controller 102. The antenna 320 may feed the received data to the RF front end 314.

In an exemplary embodiment, the relay 106 may wake up at a first, pre-specified time in order to listen on a specified, pre-determined frequency for a synchronization signal. The relay 106 may correlate the signal to a stored code for the synchronization signal and, based on this comparison, correct a clock offset local to the relay 106 (which may be less accurate due to the low-power nature of the device) to be time aligned with the clock of the controller 102 (which may be more accurate).

In a further exemplary embodiment, the relay 106 may wake up at a second, pre-specified time in order to listen on a specified, pre-determined frequency for a global scheduling data signal. The relay 106 may have stored in memory 304 or elsewhere an identifier, or fingerprint, for global scheduling data signals. The relay 106 may compare the received global scheduling data signal against the stored fingerprint to determine that global scheduling data has been received. The relay 106 may store the global scheduling data for use in further embodiments described below. In an alternative embodiment, the global scheduling data may be predetermined via a standard or may be configured on the relay 106.

In a further exemplary embodiment, the relay 106 may wake up at a third, pre-specified time in order to listen on a specified, pre-determined frequency for data transmissions or ACK/NACK signals transmitted between the controller 102 and the SAs 104. The pre-specified time and frequency are, in this embodiment, based on the global scheduling data received from the controller 102 as described above. For example, the relay 106 will wake up and listen during time slots and on frequencies scheduled for data and ACK/NACK transmissions.

During time slots scheduled for data transmissions, as the antenna 320 picks up information from the environment, the transceiver 310 will decode the data signal so that the relay 106 can cache the data signal. During time slots scheduled for ACK/NACK signals, as the antenna 320 picks up information from the environment, the transceiver 310 compares the information to a stored code for ACKs and NACKs. If the correlation value is less than (or less than/equal to) a pre-determined threshold correlation value for either an ACK or a NACK, then the transceiver 310 may determine whether an ACK nor a NACK was received. If an ACK was received, then the relay 106 can determine that it does not need to re-transmit any data and can return to sleep mode until the next scheduled data transmission time slot.

If a NACK was received, then the relay 106 may sleep until the time period scheduled for re-transmission of the associated data signal, which has been cached in the relay 106. The relay 106 will wake at the re-transmission time period, the transceiver 310 will re-encode the cached data and re-transmit it to the SA 104 or controller 102 that it was destined for. The relay 106 can determine when to re-transmit and which SA 104 or controller 102 to transmit to based on the global scheduling data. In an exemplary embodiment, the re-transmission occurs in a different frequency band from the original transmission, thereby providing frequency diversity as compared to the original, failed, data transmission and reducing the likelihood of failure during the re-transmission. For example, the initial data transmission may be on an unlicensed band while the re-transmission is on a licensed band. As the licensed band requires a paid license, it is typically less crowded than the unlicensed band and therefore it is likely that interference will be much lower. In a latency sensitive application, it may be cost-effective to pay a license fee for re-transmissions on a licensed band in order to substantially guarantee that re-transmissions are free from interference. The relay is time synchronized to a network sustaining a first frequency band and a second frequency band with a time-synchronized frame structure, where each frame contains a first time slot for the initial transmission of information, a second time slot for an ACK feedback and a third time slot for a retransmission of the information. It uses resource partitioning to support a plurality of links in the first and second frequency bands. It maps between the resources used by each link in the first, the second and the third time slots in the first and second frequency bands. It receives information for a subset of links transmitted in the first time slot in the first band based on the resource partitioning. It receives in the second time slot feedback (i.e., ACK/NACK) about the links that had successful first-slot transmissions by using the resource mapping between the first and the second time slots. It selects the links with unsuccessful first-slot transmissions, re-encoding the information received in the first time slot of the links, determining the resources used by these links in a third time slot in the second band using the mapping. Also, it transmits the information on the resources in the third time slot on the second band.

Figure 4:
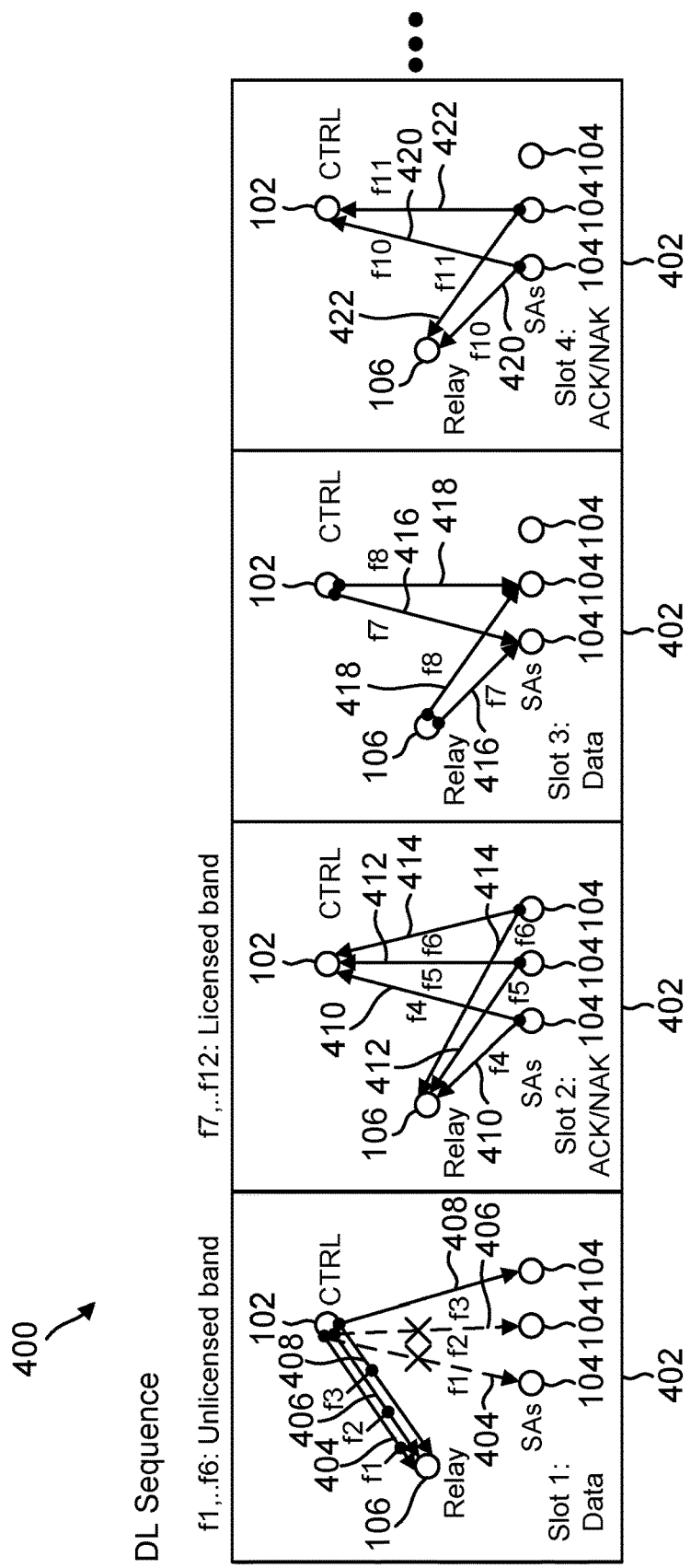
FIG. 4 is an illustration of an example downlink (DL) sequence over a network in accordance with various aspects of the present disclosure.

Referring now to FIG. 4, there is illustrated an example downlink (DL) sequence 400 over network 100. In the first time slot 402 of DL sequence 400, two of three DL transmissions from controller 102 to SAs 104 fail. The two failed transmissions 404 and 406 are on frequencies f1 and f2 and are meant for first and second SAs 104, respectively. These failures may be due to obstructions, signal interference, or the like, but this cannot be determined by the system. The third transmission 408, over frequency f3, succeeds in reaching the third SA 104. Frequencies f1, f2, and f3 may be in the unlicensed band. The relay 106 monitors all three transmissions 404, 406, and 408. As described above, the relay 106 can determine based on the global scheduling information that the time slot 402 is designated for data transmission from controller 102 to SAs 104, and can further determine that transmission 404 over f1 is destined for the first SA 104, transmission 406 over f2 is destined for the second SA 104, and transmission 408 over f3 is destined for the third SA 104. The relay 106 will decode and cache the monitored data signals, for example as cached data 307 as described above with reference to FIG. 3B. In some embodiments, the relay 106 will only cache received signals that it recognizes as data signals upon decoding.

In the second time slot 402 of DL sequence 400, the first and second SAs 104 that did not receive their expected data transmissions send NACK signals 410 and 412 to the controller 102 over frequencies f4 and f5, respectively. The third SA 104 that did receive its expected data signal sends an ACK signal 414 to the controller 102 over frequency f6. Frequencies f4, f5, and f6 can be in the unlicensed band. The relay 106 monitors these NACK and ACK signals and decodes them. Based on the global scheduling data, the controller 102 and the relay 106 are able to determine that the NACKs 410 and 412 received on frequencies f4 and f5 came from the first and second SAs 104, respectively, and that the ACK 414 received on frequency f6 came from the third SA 104. The receipt of NACKs 410 and 412 indicates to the controller 102 and the relay 106 that re-transmission of the associated data signals is requested.

In the third time slot 402 of DL sequence 400, the controller 102 and relay 106 make any requested re-transmissions. Both the controller 102 and the relay 106 can determine from the received NACKs 410 and 412 in conjunction with the global scheduling data that the first and second SAs 104 are requesting to have their data signals re-transmitted. The controller 102 and relay 106 know from the global scheduling data that frequencies f7 and f8 are allocated for use for re-transmission to first and second SAs 104 during the third time slot 402. The controller 102 and relay 106 accordingly retrieve the original data signals from their caches, re-encode the data signals, and re-transmit the data signals to the first and second SAs 104 as re-transmissions 416 and 418, respectively, on frequencies f7 and f8, respectively. Frequencies f7 and f8 can be in a licensed frequency band. In this example, first and second SAs 104 successfully receive their re-transmitted data signals. In other embodiments, if no NACKs are received by the relay 106, then the relay 106 can determine that there is no need to store the data signals that were received in the second time slot 402. Accordingly, the relay 106 may delete the data signal from the cached data 307, flag the data signal as over-writable, or otherwise free up the memory resources for other purposes.

Accordingly, in a fourth time slot 402 of the DL sequence 400, the first and second SAs 104 transmit ACK signals 420 and 422 over frequencies f10 and f11, respectively, to the controller 102. The relay 106 monitors these ACK signals 420 and 422 on frequencies f10 and f11, decodes them, and determines from the global scheduling data that they must have been sent by the first and second SAs 104. The controller 102 and relay 106 both determine from the received ACK signals 420 and 422 that the re-transmissions were successful, and no further re-transmissions are requested. In other examples, one or more of the re-transmissions may fail, and both the controller 102 and relay 106 may make second, third, or more re-transmissions over different frequencies and/or in different time slots until the data is successfully received. The maximum number of re-transmissions that will be attempted may be set across all devices in the network 100 when the system is initiated. In some embodiments, this number may be updated by transmissions from the controller 102 to SAs 104 and/or relay 106 over time. Once ACK signals 420 and 422 have been decoded at the controller 102 and relay 106, the relay 106 may delete the data signal from the cached data 307, flag the data signal as over-writable, or otherwise free up the memory resources for other purposes.

Figure 5:
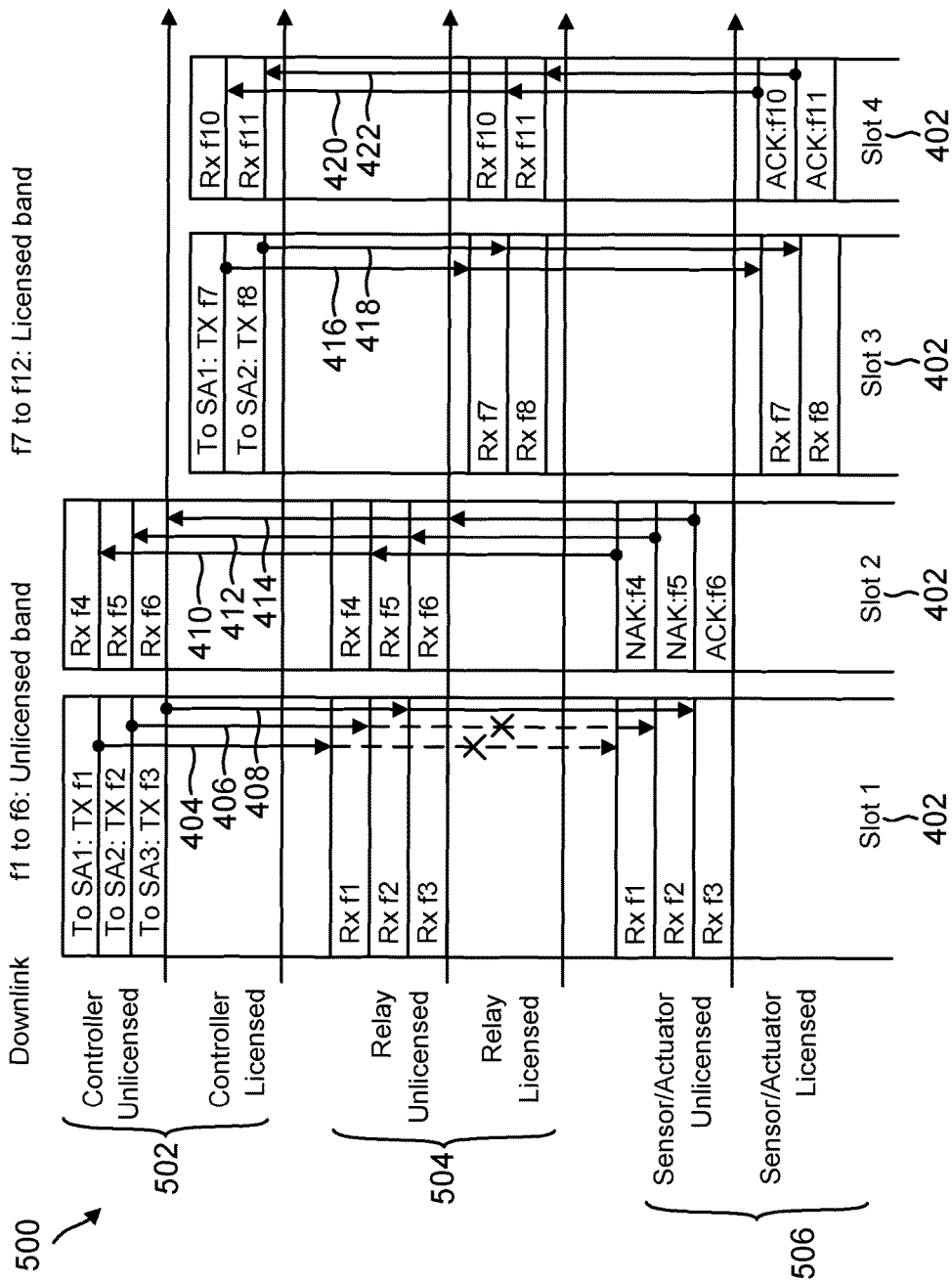
FIG. 5 is an illustration of a time and frequency mapping of the DL sequence transmissions of FIG. 4.

Referring now to FIG. 5, there is illustrated a time and frequency mapping 500 of the DL sequence 400 transmissions of FIG. 4. Bracket 502 shows transmissions made from and received at the controller 102. Bracket 504 shows transmissions made by and monitored by the relay 106. Bracket 506 shows transmissions received at and made from SAs 104.

As described above with reference to FIG. 4, in the first time slot 402, data signals 404 and 406, which are transmitted over frequencies f1 and f2, respectively, are not successfully decoded at first and second SAs 104. However, data signals 404 and 406 are successfully monitored by relay 106. Data signal 408, which is transmitted over frequency f3, is successfully decoded at the third SA 104. Frequencies f1, f2, and f3 in this example are in the unlicensed band as shown.

As further described above with reference to FIG. 4, in the second time slot 402, NACK signals 410 and 412 are sent over frequencies f4 and f5, respectively, from first and second SAs 104 to the controller 102 and are monitored by relay 106. ACK signal 414 is sent over frequency f6 from third SA 104 to controller 102 and is monitored by relay 106. Frequencies f4, f5 and f6 in this example are in the unlicensed band as shown.

As further described above with reference to FIG. 4, in the third time slot 402, the controller 102 and relay 106 send re-transmissions 416 and 418 over frequencies f7 and f8, respectively, to the first and second SAs, respectively. In this example, the first and second SAs 104 successfully decode their respective re-transmissions 416 and 418. Frequencies f7 and f8 in this example are in a licensed band as shown.

As further described above with reference to FIG. 4, in the fourth time slot 402, the first and second SAs 104 transmit to the controller 102 ACK signals 420 and 422, respectively, over frequencies f10 and f11, respectively. Relay 106 monitors ACK signals 420 and 422 and can determine that the data signals 416 and 418 were successfully decoded. Frequencies f10 and f11 in this example are in a licensed band as shown.

Figure 6:
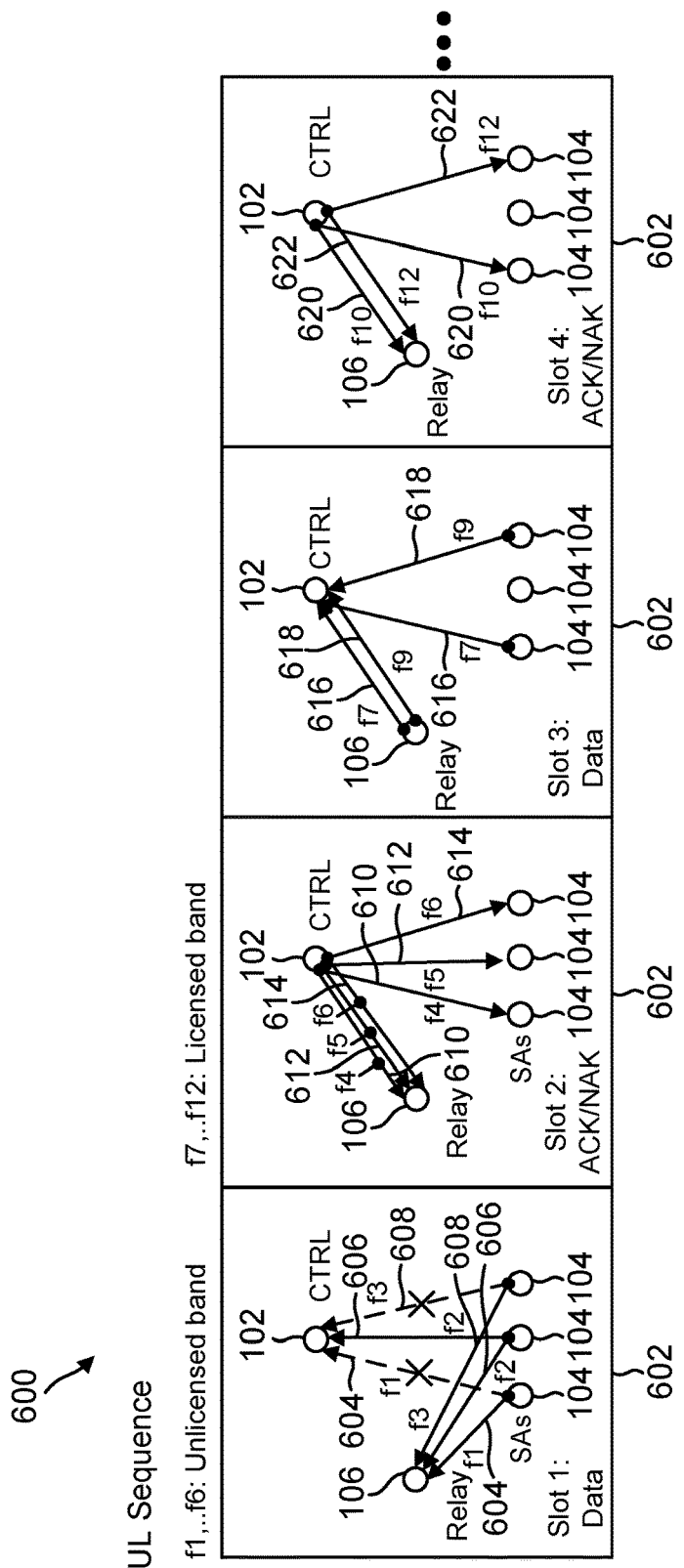
FIG. 6 is an illustration of an example uplink (UL) sequence over a network in accordance with various aspects of the present disclosure.

Referring now to FIG. 6, there is illustrated an example uplink (UL) sequence 600 over network 100. In the first time slot 602 of UL sequence 600, first and third UL transmissions 604 and 606 sent to controller 102 from first and third SAs 104, respectively, fail to decode at controller 102. First and second transmissions 604 and 608 are sent over frequencies f1 and f3, respectively. These failures may be due to obstructions, signal interference, or the like, but this cannot be determined by the system. The second transmission 606, sent by the second SA 104 over frequency f2, succeeds in reaching the controller 102. Frequencies f1, f2 and f3 may be in the unlicensed band. The relay 106 monitors all three transmissions 604, 606 and 608. As described above, the relay 106 can determine based on the global scheduling information that the time slot 602 is designated for data transmission from SAs 104 to controller 102, and can further determine that transmission 604 over f1 was sent by the first SA 104, transmission 606 over f2 was sent by the second SA 104, and transmission 608 over f3 was sent by the third SA 104. The relay 106 will decode and cache the monitored data signals. In some embodiments, the relay 106 will only cache received signals that it recognizes as data signals upon decoding.

In the second time slot 602 of UL sequence 600, the controller 102 sends NACK signals 610 and 614 on frequencies f4 and f6, respectively, to the first and third SAs 104, respectively. The controller sends an ACK signal 612 over frequency f5 to the second SA 104. Frequencies f4, f5 and f6 may be in the unlicensed band. The relay 106 monitors these NACK and ACK signals and decodes them. Based on the global scheduling data, the relay 106 is able to determine that the NACKs 610 and 614 received on frequencies f4 and f6 were intended for the first and third SAs 104, respectively, and that the ACK 612 received on frequency f5 was intended for the second SA 104. The receipt of NACKs 610 and 614 indicates to the relay 106 and to the first and third SAs 104 that re-transmission of the associated data signals is requested.

In the third time slot 602 of UL sequence 600, the relay 106 and the first and third SAs 104 make any requested re-transmissions. The relay can determine from the received NACKs 610 and 614 in conjunction with the global scheduling data that controller 102 is requesting to have the data transmissions sent by the first and third SAs 104 re-transmitted to the controller 102. The first and third SAs 104 know simply from the NACKs 610 and 614 that re-transmission of their data signals is required, as they can determine that only controller 102 could have sent the NACK. The relay 106 and the first and third SAs 104 know from the global scheduling data that frequencies f7 and f9 are allocated for re-transmissions from first and third SAs 104 during the third time slot 602. The relay 106 and the first and third SAs 104 accordingly retrieve the data signals from their caches, re-encode the data signals, and re-transmit the data signals to the controller 102 as re-transmissions 616 and 618, respectively, on frequencies f7 and f9, respectively. Frequencies f7 and f9 may be in a licensed frequency band. In this example, the controller 102 successfully decodes all re-transmitted data signals. In other embodiments, if no NACKs are received by the relay 106, the relay 106 can determine that there is no need to store the data signals that were received in the second time slot 602. Accordingly, the relay 106 may delete the data signal from the cached data 307, flag the data signal as over-writable, or otherwise free up the memory resources for other purposes.

Accordingly, in a fourth time slot 602 of the UL sequence 600, the controller 102 transmits ACK signals 620 and 622 over frequencies f10 and f12, respectively, to the first and third SAs 104, respectively. The relay 106 monitors these ACK signals 620 and 622 on frequencies f10 and f12, decodes them, and can determine from the global scheduling data that they must have been sent to the first and third SAs 104, respectively. The relay 106 and the first and third SAs 104 determine from the received ACK signals 620 and 622 that the re-transmissions were successful, and no further re-transmissions are requested. In other examples, one or more of the re-transmissions may fail, and the relay 106 and first and third SAs 104 may make second, third, or more re-transmissions over different frequencies and in different time slots until the data is successfully received. The maximum number of re-transmissions that will be attempted may be set across all devices in network 100 when the system is initiated. In some embodiments, this number may be updated by transmissions from the controller 102 to SAs 104 and relay 106. Once ACK signals 620 and 622 have been decoded, the relay 106 may delete the data signal from the cached data 307, flag the data signal as over-writable, or otherwise free up the memory resources for other purposes.

Figure 7:
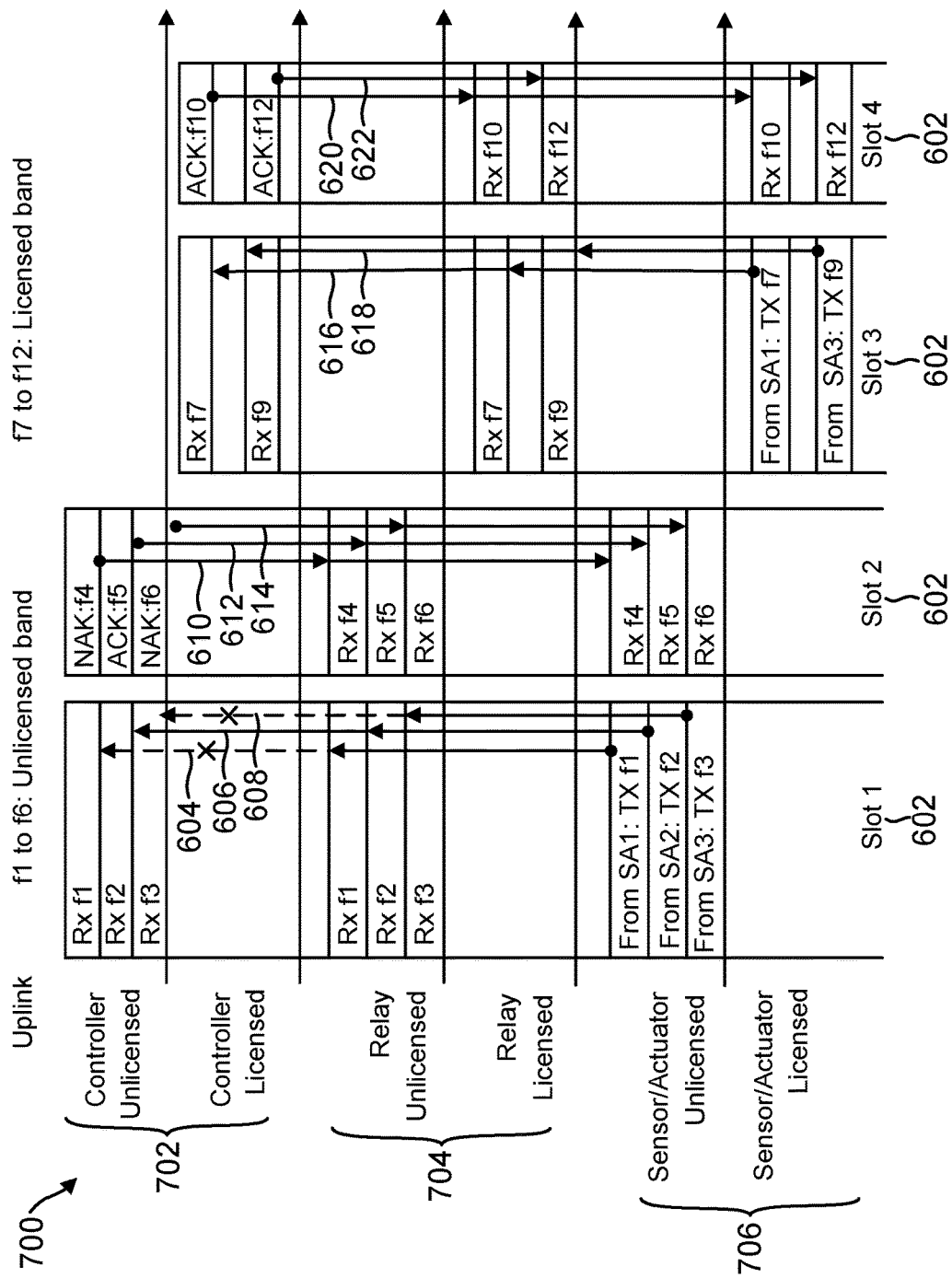
FIG. 7 is an illustration of a time and frequency mapping of the UL sequence transmissions of FIG. 6.

Referring now to FIG. 7, there is illustrated a time and frequency mapping 700 of the UL sequence 600 transmissions shown in FIG. 6. Bracket 702 shows transmissions made from and received at the controller 102. Bracket 704 shows transmissions made by and monitored by the relay 106. Bracket 706 shows transmissions received at and made from SAs 104.

As described above with reference to FIG. 6, in the first time slot 602, data signals 604 and 608, which are transmitted over frequencies f1 and f3, respectively, are not successfully decoded at controller 102. However, data signals 604 and 608 are successfully monitored by relay 106. Data signal 606, which is transmitted over frequency f2, is successfully decoded at the controller 102. Frequencies f1, f2 and f3 in this example are in the unlicensed band as shown.

As further described above with reference to FIG. 6, in the second time slot 602, NACK signals 610 and 614 are sent over frequencies f4 and f6, respectively, from the controller 102 to first and third SAs 104 and are monitored by relay 106. ACK signal 612 is sent over frequency f5 from controller 102 to the third SA 104 and is monitored by relay 106. Frequencies f4, f5 and f6 in this example are in the unlicensed band as shown.

As further described above with reference to FIG. 6, in the third time slot 602, the first and third SAs 104 and relay 106 send re-transmissions 616 and 618 over frequencies f7 and f9, respectively, to the controller 102. In this example, the controller 102 successfully decodes both re-transmissions 616 and 618. Frequencies f7 and f9 in this example are in a licensed band as shown.

As further described above with reference to FIG. 6, in the fourth time slot 602, the the controller 102 transmits to the first and second SAs 104 ACK signals 620 and 622, respectively, over frequencies f10 and f12, respectively. Relay 106 monitors ACK signals 620 and 622, and can determine that data signals 616 and 618 were successfully decoded. Frequencies f10 and f12 in this example are in a licensed band as shown.

Figure 8:
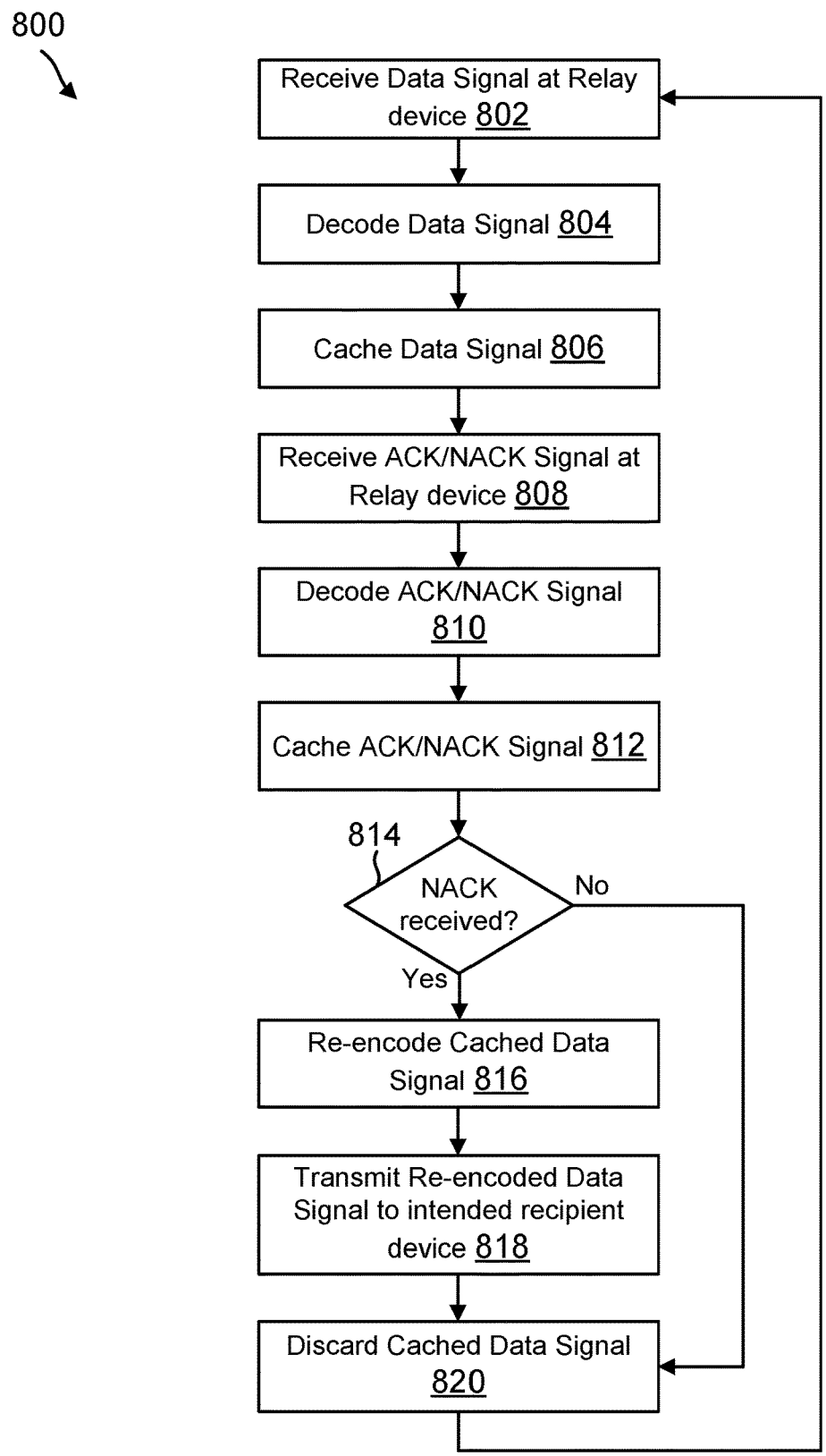
FIG. 8 is a flowchart of a method of reducing errors in a wireless network according to some aspects of the present disclosure.

Referring now to FIG. 8, there is illustrated a flowchart of a method 800 of reducing errors in a wireless network according to some aspects of the present disclosure. It is understood that additional steps can be provided before, during, and after the steps of method 800, and that some of the steps described can be replaced or eliminated for other embodiments of the method 800. For example, the method 800 can be modified to include aspects of the techniques for reducing errors in wireless communications described in other parts of the present disclosure.

Beginning at block 802, a first wireless device such as a relay device 106 receives a data signal on a first frequency resource during a first time period. The data signal is transmitted from a second wireless device, such as a controller 102 or an SA 104, to a third wireless device, such as an SA 104 or a controller 102.

At block 804, the relay 106 decodes the data signal. At block 806, the relay 106 caches the decoded data signal by, for example, storing it in memory 304 as cached data 307. At block 808, the relay 106 receives an ACK/NACK signal during a second time period. At block 810, the relay 106 decodes the ACK/NACK signal. At block 812, the relay 106 caches the decoded ACK/NACK signal by, for example, storing it in memory 304. In some embodiments, the relay 106 does not cache the decoded ACK/NACK signal, but moves directly to decision block 814 from block 810. At decision block 814, the relay 106 determines whether a NACK signal was received.

At block 816, if a NACK was received then the relay 106 retrieves the cached data signal and re-encodes it for re-transmission on a second frequency resource. At block 818, the relay 106 re-transmits the data signal to the third wireless device on the second frequency resource during a third time period.

At block 820, after re-transmission of the re-encoded data signal, the relay 106 may discard the cached data signal from its cache. The method then returns to block 802 when it receives a subsequent data signal.

Returning to decision block 814, if the relay 106 determine that no NACK was received (e.g., an ACK was received), then the method moves to block 820, and the cached data is discarded from the cache. The method then returns to block 802 when it receives a subsequent data signal.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C). As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   receiving, at a first wireless communication device, a data signal, the data signal being transmitted on a first frequency resource from a second wireless communication device to a third wireless communication device;
   receiving, at the first wireless communication device, an ACK/NACK signal being transmitted from the third wireless communication device to the second wireless communication device;
   determining, at the first wireless communication device, if the ACK/NACK signal is a NACK signal;
   determining, at the first wireless communication device, a scheduled time and second frequency resource for the second wireless communication device to re-transmit the data signal, the first frequency resource being in an unlicensed frequency band and the second frequency resource being in a licensed frequency band; and
   transmitting, from the first wireless communication device to the third wireless communication device, the data signal at the scheduled time on the second frequency resource, in response to determining that the ACK/NACK signal is a NACK signal.

2. The method of claim 1, further comprising:
   receiving, at the first wireless communication device, scheduling information for the second and third wireless communication devices comprising the scheduled time and second frequency.

3. The method of claim 2, wherein:
   the scheduling information includes at least:
      that the second wireless communication device is scheduled to transmit the data signal to the third wireless communication device on the first frequency resource during a first time period,
      that the third wireless communication device is scheduled to transmit the ACK/NACK signal to the second wireless communication device during a second time period after the first time period, and
      that the second wireless communication device is scheduled to re-transmit to the third wireless communication device at the scheduled time and on the second frequency resource during a third time period after the second time period.

4. The method of claim 1, further comprising:
   receiving, at the first wireless communication device, a synchronization beacon; and
   using the synchronization beacon to maintain timing synchronization with the second and third wireless communication devices.

5. The method of claim 4, wherein the synchronization beacon is periodically received at pre-specified time intervals.

6. The method of claim 1, further comprising:
   decoding, at the first wireless communication device, the data signal;
   caching, at the first wireless communication device, the decoded data signal;
   decoding, at the first wireless communication device, the ACK/NACK signal; and
   retrieving, at the first wireless communication device, the cached data signal if the ACK/NACK signal is determined to be a NACK signal.

7. The method of claim 1, further comprising:
   encoding, at the first wireless communication device, the data signal before transmitting the data signal to the third wireless communication device.

8. The method of claim 1, wherein:
   the first wireless communication device is a wireless relay device,
   the second wireless communication device is at least one of a sensor device or an actuator device, and
   the third wireless communication device is a controller device.

9. The method of claim 1, wherein:
   the first wireless communication device is a wireless relay device,
   the second wireless communication device is a controller device, and
   the third wireless communication device is at least one of a sensor device or an actuator device.

10. A method of wireless communication, comprising:
receiving, at a first wireless communication device, a notification that a data signal will be transmitted to the first wireless communication device from a second wireless communication device on a first frequency resource during a first time period;
transmitting, from the first wireless communication device, a NACK indicating that the data signal was not properly received from the second wireless communication device during a second time period; and
receiving, at the first wireless communication device, the data signal from a third wireless communication device on a second frequency resource at a scheduled time during a third time period, and from the second wireless communication device on the second frequency resource and at the scheduled time,
wherein the first frequency resource is in an unlicensed frequency band and the second frequency resource is in a licensed frequency band.

11. The method of claim 10, further comprising:
receiving, at the first wireless communication device, a synchronization beacon; and
using the synchronization beacon to maintain timing synchronization with the second and third wireless communication devices.

12. The method of claim 10, wherein:
the first wireless communication device is at least one of a sensor device or an actuator device,
the second wireless communication device is a controller device, and
the third wireless communication device is a wireless relay device.

13. The method of claim 10, wherein:
the first wireless communication device is a controller device,
the second wireless communication device is at least one of a sensor device or an actuator device, and
the third wireless communication device is a wireless relay device.

14. A first wireless communication device, comprising:
a transceiver configured to receive a data signal being transmitted from a second wireless communication device to a third wireless communication device on a first frequency resource, the transceiver further configured to receive an ACK/NACK signal being transmitted from the third wireless communication device to the second wireless communication device; and
a processor configured to determine if the ACK/NACK signal is a NACK signal and a scheduled time and second frequency resource for the second wireless communication device to re-transmit the data signal, the first frequency resource being in an unlicensed frequency band and the second frequency resource being in a licensed frequency band,
the transceiver further configured to transmit to the third wireless communication device the data signal at the scheduled time on the second frequency resource, in response to the processor determining that the ACK/NACK signal is a NACK signal.

15. The first wireless communication device of claim 14, wherein the transceiver is further configured to receive scheduling information for the second and third wireless communication devices comprising the scheduled time and the second frequency resource.

16. The first wireless communication device of claim 15, wherein:
the scheduling information includes at least:
that the second wireless communication device is scheduled to transmit the data signal to the third wireless communication device on the first frequency resource during a first time period,
that the third wireless communication device is scheduled to transmit the ACK/NACK signal to the second wireless communication device during a second time period after the first time period, and
that the second wireless communication device is scheduled to re-transmit to the third wireless communication device at the scheduled time and on the second frequency resource during a third time period after the second time period.

17. The first wireless communication device of claim 14, wherein:
the transceiver is further configured to receive a synchronization beacon, and
the processor is further configured to use the synchronization beacon to maintain timing synchronization with the second and third wireless communication devices.

18. The first wireless communication device of claim 17, wherein the transceiver is further configured to receive the synchronization beacon at pre-specified time intervals.

19. The first wireless communication device of claim 14, wherein:
the processor is further configured to decode the data signal,
the processor is further configured to cache the decoded data signal,
the processor is further configured to decode the ACK/NACK signal, and
the processor is further configured to retrieve the cached data signal if the ACK/NACK signal is determined to be a NACK signal.

20. The first wireless communication device of claim 14, wherein the processor is further configured to encode the data signal before transmitting the data signal to the third wireless communication device.

21. The first wireless communication device of claim 14, wherein:
the first wireless communication device is a wireless relay device,
the second wireless communication device is at least one of a sensor device or an actuator device, and
the third wireless communication device is a controller device.

22. The first wireless communication device of claim 14, wherein:
the first wireless communication device is a wireless relay device,
the second wireless communication device is a controller device, and
the third wireless communication device is at least one of a sensor device or an actuator device.

23. A first wireless communication device, comprising:
a transceiver configured to:
receive a notification that a data signal will be transmitted to the first wireless communication device from a second wireless communication device on a first frequency resource during a first time period,
transmit a NACK indicating that the data signal was not properly received from the second wireless communication device during a second time period, and
receive the data signal from a third wireless communication device on a second frequency resource at a scheduled time during a third time period, and from the second wireless communication device on the second frequency resource and at the scheduled time, wherein the first frequency resource is in an unlicensed frequency band and the second frequency resource is in a licensed frequency band.

24. The first wireless communication device of claim 23, wherein:
   the transceiver further is configured to receive a synchronization beacon, and
   the first wireless communication device further comprises a processor configured to use the synchronization beacon to maintain timing synchronization with the second and third wireless communication devices.

25. The first wireless communication device of claim 23, wherein:
   the first wireless communication device is at least one of a sensor device or an actuator device,
   the second wireless communication device is a controller device, and
   the third wireless communication device is a wireless relay device.

26. The first wireless communication device of claim 23, wherein:
   the first wireless communication device is a controller device,
   the second wireless communication device is at least one of a sensor device or an actuator device, and
   the third wireless communication device is a wireless relay device.

* * * * *